(12) United States Patent
Christiansen et al.

(10) Patent No.: US 10,936,441 B2
(45) Date of Patent: Mar. 2, 2021

(54) WRITE-AHEAD STYLE LOGGING IN A PERSISTENT MEMORY DEVICE

(71) Applicant: MICROSOFT TECHNOLOGY LICENSING, LLC, Redmond, WA (US)

(72) Inventors: Neal Robert Christiansen, Bellevue, WA (US); Atul Pankaj Talesara, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 405 days.

(21) Appl. No.: 15/844,465

(22) Filed: Dec. 15, 2017

(65) Prior Publication Data

US 2019/0188091 A1     Jun. 20, 2019

(51) Int. Cl.
*G06F 7/02* (2006.01)
*G06F 16/00* (2019.01)
(Continued)

(52) U.S. Cl.
CPC .......... *G06F 11/1469* (2013.01); *G06F 3/065* (2013.01); *G06F 3/0613* (2013.01);
(Continued)

(58) Field of Classification Search
CPC .... G06F 3/0613; G06F 16/11; G06F 16/2365; G06F 16/2358; G06F 16/1865; G06F 3/0619; G06F 11/1471; G06F 16/2379; G06F 3/0688; G06F 3/065; G06F 3/0643; G06F 11/1458; G06F 2201/80
See application file for complete search history.

(56) References Cited

U.S. PATENT DOCUMENTS 6,901,481 B2   5/2005  Olson
9,280,578 B1   3/2016  Zhou et al.
(Continued)

FOREIGN PATENT DOCUMENTS

EP     2590078 A2      5/2013
WO   2016095151 A1    6/2016

OTHER PUBLICATIONS

"Creating a file system log on a dedicated disk for a user-defined volume groups", Retrieved from: <<https://www.ibm.com/support/knowledgecenter/en/ssw_aix_71/com.ibm.aix.osdevice/lvmmt_createfilsyslog.htm>>, Retrieved on: Oct. 27, 2017, 3 Pages.
(Continued)

*Primary Examiner* — Bruce M Moser
(74) *Attorney, Agent, or Firm* — Newport IP, LLC; David W. Foster (57) ABSTRACT

The techniques disclosed herein improve performance of file system logging by writing log data to persistent memory instead of staging in RAM before writing to disk. In one embodiment, while the log is being written, checksums are inserted, such that during recovery, the checksums can be used to distinguish good log pages from bad log pages. In this way, good log pages can be evaluated to determine whether to roll a portion of a file system transaction forward, backward, or do nothing, while bad log pages can be safely ignored. Additionally or alternatively, non-temporal copies are employed when writing data to persistent memory, thereby reducing an amount of time log data is exposed to be lost in a crash.

20 Claims, 5 Drawing Sheets

(51) Int. Cl.
  *G06F 11/14* (2006.01)
  *G06F 16/23* (2019.01)
  *G06F 16/18* (2019.01)
  *G06F 16/11* (2019.01)
  *G06F 3/06* (2006.01)

(52) U.S. Cl.
  CPC .......... *G06F 3/0619* (2013.01); *G06F 3/0643* (2013.01); *G06F 3/0688* (2013.01); *G06F 11/1458* (2013.01); *G06F 11/1471* (2013.01); *G06F 16/11* (2019.01); *G06F 16/1865* (2019.01); *G06F 16/2358* (2019.01); *G06F 16/2365* (2019.01); *G06F 16/2379* (2019.01); *G06F 2201/80* (2013.01)

(56) References Cited

U.S. PATENT DOCUMENTS

| | | | | |
|---|---|---|---|---|
| 2002/0091903 | A1* | 7/2002 | Mizuno | G06F 3/0689 711/154 |
| 2005/0278394 | A1* | 12/2005 | Oks | G06F 11/1402 |
| 2006/0039698 | A1 | 2/2006 | Pautler et al. | |
| 2012/0254120 | A1 | 10/2012 | Fang et al. | |
| 2013/0198585 | A1 | 8/2013 | Braam et al. | |
| 2014/0164828 | A1 | 6/2014 | Banikazemi et al. | |
| 2016/0092223 | A1 | 3/2016 | Wang et al. | |
| 2016/0342641 | A1* | 11/2016 | Wang | G06F 16/289 |
| 2016/0350353 | A1 | 12/2016 | Li | |
| 2017/0132136 | A1 | 5/2017 | Ergan et al. | |
| 2019/0012357 | A1* | 1/2019 | Schreter | G06F 16/215 |

OTHER PUBLICATIONS

"International Search Report and Written Opinion Issued in PCT Application No. PCT/US2018/062391", dated Mar. 8, 2019, 16 Pages.

* cited by examiner

WRITE-AHEAD STYLE LOGGING IN A PERSISTENT MEMORY DEVICE

BACKGROUND

Storage is integral to the computing experience. Software crashes, power is lost, and batteries die, and so without the ability to store data in non-volatile memory, even the most basic computing tasks, such as saving data, sharing files, deploying applications, etc., would be impossible or meaningless.

Many types of non-volatile storage have been developed, such as disk drives, tape drives, NAND based solid state drives, and more recently, persistent memory. Each type of storage exhibits trade-offs between access time, throughput, capacity, volatility, cost, etc. As a result, techniques that work well for utilizing one type of storage may prove inefficient for another. For example, file systems for a disk drive may assume volatility, a large sector size, reliability limitations, and throughput concerns. As such, file system algorithms that are optimized for a disk drive may be inefficient when applied to other types of storage.

SUMMARY

Existing file system logs are typically stored in volatile random access memory (RAM) before being written to a permanent storage device, such as a hard drive. The techniques disclosed herein improve performance of file system logging by writing log data to persistent memory instead of staging log data in RAM before writing to disk. In one embodiment, the process of writing log data to the persistent memory device hardens the log nearly immediately—e.g. it makes the log durable in the event of a power outage, CPU halt, or other event that causes the contents of RAM to be lost. In addition to increased runtime performance, writing log data to persistent memory causes crash recovery to be more efficient, as it is less likely that log data is lost due to a crash, and when there is a crash, less data will be lost.

However, while writing log data to non-volatile persistent memory reduces the likelihood of losing log data during a crash, information may be in the process of being written to the persistent memory when a crash occurs, leaving the log in an inconsistent state. In one embodiment disclosed herein, while the log is being written, checksums are inserted, such that during recovery, the checksums can be used to distinguish good log pages from bad log pages. In this way, good log pages can be analyzed in conjunction with file system metadata tables to determine whether to roll a portion of a transaction forward, backward, or do nothing. Bad log pages are one indication that a transaction was not committed. Since metadata tables are hardened after file system transactions are committed, an indication that a transaction was not committed (i.e. an absence of a transaction commit log record) is an indication that, for this particular transaction, there are no hardened metadata table entries that need to be undone. As such, bad log pages can be safely ignored.

Additionally or alternatively, one embodiment disclosed herein generates non-temporal copies of data as log data that is copied to persistent memory. In one embodiment, non-temporal copies are copies that bypass a memory system's cache, thereby further reducing the likelihood that a given page of log data will be lost during a crash. For example, CPU caches such as level 1 cache (L1 cache) may be skipped, written through, or flushed after writing, thereby reducing the amount of time data exists in the volatile cache before being written to non-volatile persistent memory.

A file system is a core component of an operating system, and so the improvements described herein are a technical solution to a problem inherent to computing—how to maximize the speed and efficiency of non-volatile storage.

BRIEF DESCRIPTION OF THE DRAWINGS

The Detailed Description is described with reference to the accompanying figures. In the figures, the left-most digit(s) of a reference number identifies the figure in which the reference number first appears. The same reference numbers in different figures indicate similar or identical items. References made to individual items of a plurality of items can use a reference number with a letter or a sequence of letters to refer to each individual item. Generic references to the items may use the specific reference number without the sequence of letters.

DETAILED DESCRIPTION

The following Detailed Description describes methods of file system logging for persistent memory storage devices.

As used herein, "persistent memory" refers to a byte-addressable memory device that retains information when power is withdrawn. Persistent memory is addressable over a memory bus, in contrast to other types of non-volatile storage such as hard drives and NAND based solid state drives (SSDs), which provide sector-based addressing, and which are not directly addressable via a memory bus.

As used herein, "file system log" refers to a repository of file system transaction data. Each transaction includes changes to metadata tables that, when applied, cause a file system operation to be performed. For example, a log record associated with a "create file" operation may include a directory table entry to be created and a master file table entry to be created. In the event of a crash or other system instability, a file system log may be inspected to confirm that the file system's metadata tables are in a consistent state—e.g. that for a given transaction, all changes to metadata tables are applied. File system metadata consistency may also be achieved by undoing changes to metadata tables when a file system transaction was only partially recorded in the file system log.

As used herein, "volatile memory" refers to a storage device that loses data when the device's power supply is interrupted. Power may be interrupted due to a power outage, battery exhaustion, manual reboot, scheduled reboot, or the like.

As used herein, "hardening" refers to committing a piece of data to a non-volatile storage device. Hardened data is resilient to system crashes, power outages, and other disruptions that would cause data in a volatile storage device to be lost.

As used herein, "transaction" refers to one or more file system log records followed by a commit log record indicating that all components of the transaction have been recorded in the log.

As used herein, "commit" refers to indicating, with a commit log record, that all components of the transaction have been recorded, whether in volatile or non-volatile memory.

Figure 1:
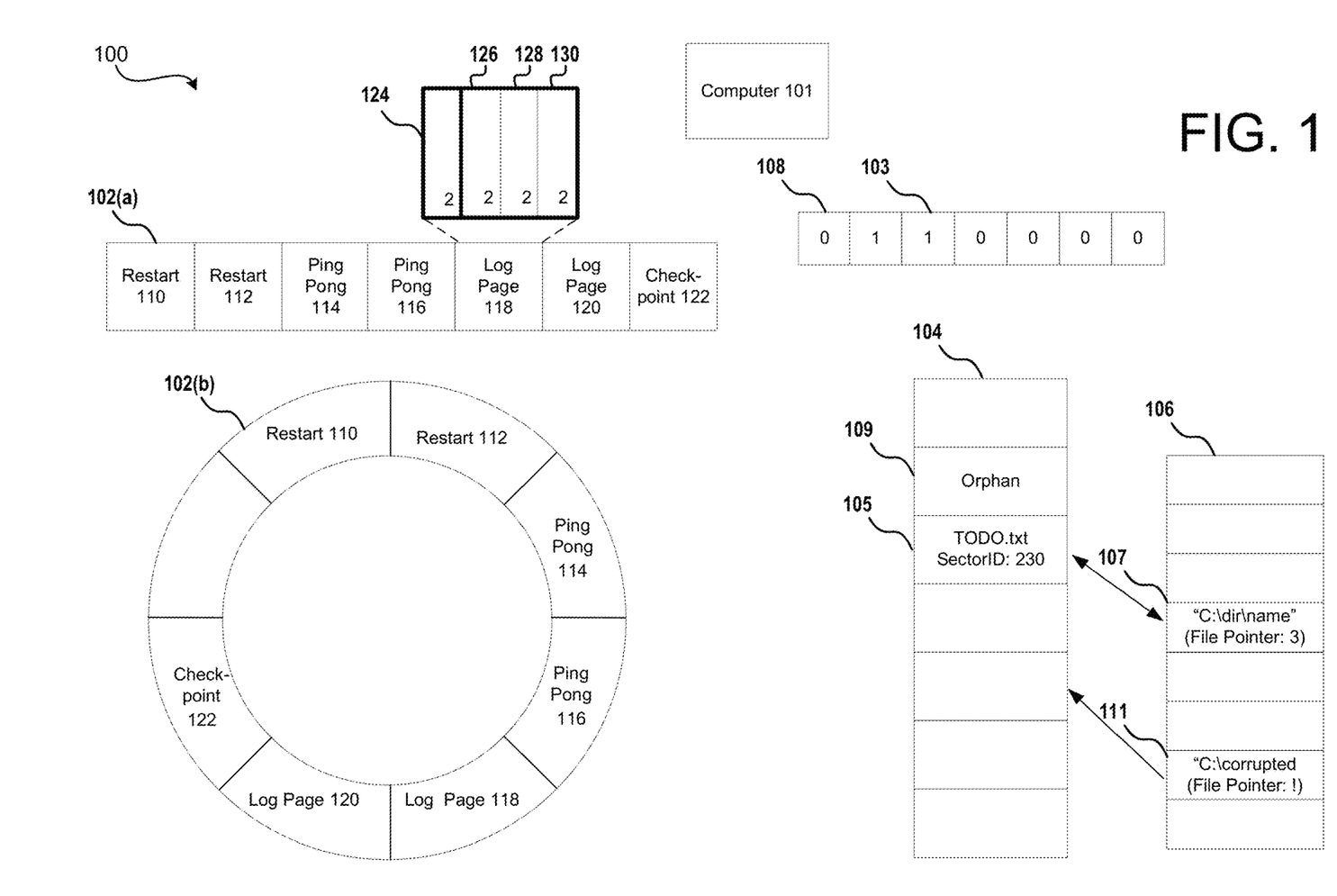
FIG. 1 shows prior art portions of a file system used to commit, roll forward, and roll backward file operation metadata using volatile RAM and a disk drive.

Turning now to FIG. 1, illustrated are portions of a file system 100 used to commit, roll forward, and roll backward file operation metadata using volatile RAM and a disk drive. In one embodiment, file system 100 is part of computer 101. File system log 102 is depicted twice—first, as it appears in memory, as file system 102(a), and again, as conceived of logically, as a circular buffer 102(b). As discussed below, file system log 102 stores metadata related to a file system operation as a transaction, such that when recovering from a system crash, elements of the transaction can be either all applied or all undone, based on whether the transaction was completed or not.

Master file table 104 depicts a table containing metadata associated with a file stored on the storage device. Each entry may include a file name (e.g. entry 105 has a name of "TODO.txt"), one or more SectorID's ("230") which describe the contents of the file, where the file begins on the storage device, a file size, a creation date, a last used date, etc. Similarly, directory table 106 depicts a table in which entries contain at least a directory name and a pointer to an entry in the master file table, such as entry 107, which has a directory name of "c:\dir\name" and a pointer "3" pointing to entry 105 in MFT 104. Master file table (MFT) bitmap 108 indicates which entries in MFT 104 are empty and which are in use. In this example, entry 103 indicates that the third entry (MFT entry 105) is in use. As discussed in more detail below, each of these metadata tables may be updated during a recovery operation when changes indicated in file system log 102 are missing from the appropriate metadata table. Other metadata tables, such as a cluster bitmap that controls how clusters are allocated on the storage device by indicating which clusters are available (and which are not), are similarly contemplated.

When a file operation, such as creating, appending to, deleting, moving, copying, or renaming a file, etc., is performed, entries in multiple metadata tables are updated. However, because these metadata tables are stored in different locations, it isn't possible to perform one I/O operation to atomically harden them—i.e. it isn't possible to harden all of these entries with a single storage operation, such that either all of the entries are hardened, or in the case of an error, none of them are hardened. This presents a challenge—how can a system update all of these pieces atomically? If an MFT 104 entry and a directory table 106 entry are saved to disk in series, a crash, power outage, or other failure may interfere with one operation but not the other, leaving the file system in an inconsistent state.

One solution to this problem is a file system log, such as a write-ahead style log, also known as an Aries style log, depicted in FIG. 1 as file system log 102. In one embodiment, log 102 comprises two restart pages 110 and 112, two "ping-pong" pages 114 and 116, and the body of the log. The body of the log contains log pages 118 and 120, each of which may be associated with one or more transaction IDs. For example, log page 118 is depicted as having header 124 and log records 126-130.

Generally speaking, file system log 102 describes changes to metadata tables that, when committed, define a requested file system operation. For example, consider a scenario where a computer creates a file. First, the computer allocates a bit 103 out of the MFT bitmap 108 to find a free MFT 104 entry. By allocating a bit out of MFT bitmap 108, the computer implements a change in the MFT bitmap, e.g., adding a value in one slot indicating an update to an MFT record. Then, the computer initializes the corresponding MFT entry, e.g. entry 105, with a sector ID, a file name (e.g. "TODO"), a directory ID that points to entry 107 in directory table 106, timestamps, etc. Next, entry 107 in directory table 106 is initialized—specifically the entry pointed to by MFT entry 105 is initialized. In one embodiment, entry 107 contains a directory name where the file is to be created, a pointer to the MFT record (e.g. an MFTID of 3 pointing to record 105), etc. In one embodiment the order in which these metadata table entries are created is immaterial, and changes can be made in any order.

For each change to a metadata table, a record is added to file system log 102 indicating how to perform the change (also known as "roll forward" or "redo") and how to undo the change (also known as "roll back"). For example, log page 118 includes a header 124 and two log records, log record 126 and log record 128, each of which describes how to roll forward and backward a change to a metadata table. A log record may take up less memory than a log page, in which case other log records may also be stored in the same log page. Additionally or alternatively, a log record may require more memory than a single log page, or more memory than remains in a single log page, in which case the log record may span multiple log pages. Each log record also includes a transaction ID field. Log records that are part of the same transaction can be identified by having the same transaction ID. Furthermore, each log record is associated with a log sequence number (e.g. "2"). The log sequence number may be a monotonically increasing number that is used to determine the state of a given record in a metadata file. By comparing log sequence numbers, a state of a given metadata file entry can be determined. Once each log record has been added to the file system log 102, a commit record 130, which also includes the transaction ID, is added, indicating that all information necessary to redo or undo the requested file system operation is contained in the log.

At this point, changes to the metadata tables and file system log have been made in-memory (e.g. in volatile RAM), such that a crash, loss of power, etc., would cause the requested file system operation to fail. However, while the file system operation would fail, the file system itself would be left in a consistent state, as no changes have been made to the underlying drive. For example, there would not be any orphaned entries in metadata tables, e.g. orphan 109, nor would there be any entries in metadata tables pointing to corrupt, e.g. corrupted 111, non-existent, or expired entries in other metadata tables, in directory table 106 pointing to a non-existent entry in master file table 104.

In one embodiment, once a commit record has been added to log 102, the file system request may be "hardened" by persisting the changes to disk. However, log records may be hardened at any time, e.g. before a commit record has been added. If a log record is hardened before a corresponding commit record is hardened, and a failure occurs, the file system can utilize the "roll back" information included in the hardened log record to recover the file system into a consistent state.

In one embodiment, there is a single rule that must be followed to ensure integrity of a file system using a write-ahead style log: log records, such as 126 and 128, must be hardened before any changes are made to metadata tables 104-108. Once changes to log 102 are hardened, the file system has all the information necessary to recreate and/or roll back changes to metadata tables 104-108. Specifically, during recovery, the file system can compare the log serial number included in log records to a corresponding log serial number included in metadata tables 104-108, and determine whether to roll a log record forward or backward, based on the comparison. A change to a metadata table can be rolled back, for example, when a corresponding hardened log record is found, but for which no corresponding commit record can be found. Changes in a log record can be rolled forward, for example, when a hardened log record is found for which a corresponding commit record is found, but the change described in the log record has not been hardened to a metadata table.

It is also possible that a system crash happens as log 102 is in the process of being hardened to disk, but before the transaction is completely hardened (i.e. one or more log records of a given transaction are not hardened). In these instances, corresponding metadata table changes for the incomplete transaction may also have been hardened to disk. In these scenarios it is possible for incomplete or otherwise corrupted transactions to be found in the log during a recovery operation, and for the file system to be in an inconsistent state due to the partial hardening of metadata table entries.

In one embodiment, log records without a corresponding commit record are identified. These log records cannot be "rolled forward" because the transaction is incomplete—partially rolling forward a transaction would leave the file system in an inconsistent state. So, in these scenarios, log entries are used to "undo" any corresponding changes that were made to a metadata table, restoring file system integrity.

The file system log 102 depicted in FIG. 1 includes restart pages 110 and 112, one or the other of which is updated as log 102 is committed to disk. Restart pages 110 and 112 create checkpoints into log 102, e.g. checkpoint 122, which can be used during recovery to avoid processing log pages that are no longer relevant. Typically, log pages are no longer relevant because corresponding changes have already been made to metadata tables 104-108. For logs that could be 64 megabytes in length or more, this provides a substantial performance benefit compared to re-processing portions of the log that are known to have already been processed. As such, during a commit of log 102, one of the two checkpoints is updated to point to the next available log page. The other checkpoint is maintained as a failsafe, in case a crash happens while log 102 is being hardened, in which case the previous checkpoint will be used.

The file system log 102 depicted in FIG. 1 also includes ping pong pages 114 and 116. Ping pong pages are used to batch transactions before writing a sector out to disk. This is done because log records can be of varying size, e.g. from 20 bytes to 512 kilobytes. Since log records can be smaller than a typical storage device sector size of 512 bytes, multiple records are stored in the same 512 byte sector to avoid wasted space. However, if one log record is hardened to disk in a given sector, and a second log record is later hardened using different bytes in the same sector, a failure during the second hardening could cause information stored in the first hardening to be lost, as sector writes succeed or fail atomically. This could corrupt file system integrity, as information stored in the first hardening will be lost while corresponding metadata table entries will remain.

Ping pong pages 114 and 116 solve this problem by building up two copies of a sector in a staging area. For example, a first log record is stored in page 114, and is hardened. Then, upon receiving a second log record, the first log record is copied to page 116, followed by the second log record, and page 116 is hardened. This repeats—upon receipt of a third log record, the second log record and third log record are appended to page 114, which now has the first, second, and third log records in order, and is hardened. Thus as log records are added, if at any point a hardening fails, the previous state of the sector is retained in the other ping pong page. Once the sector is filled, it is copied to the body of the log.

Figure 2:
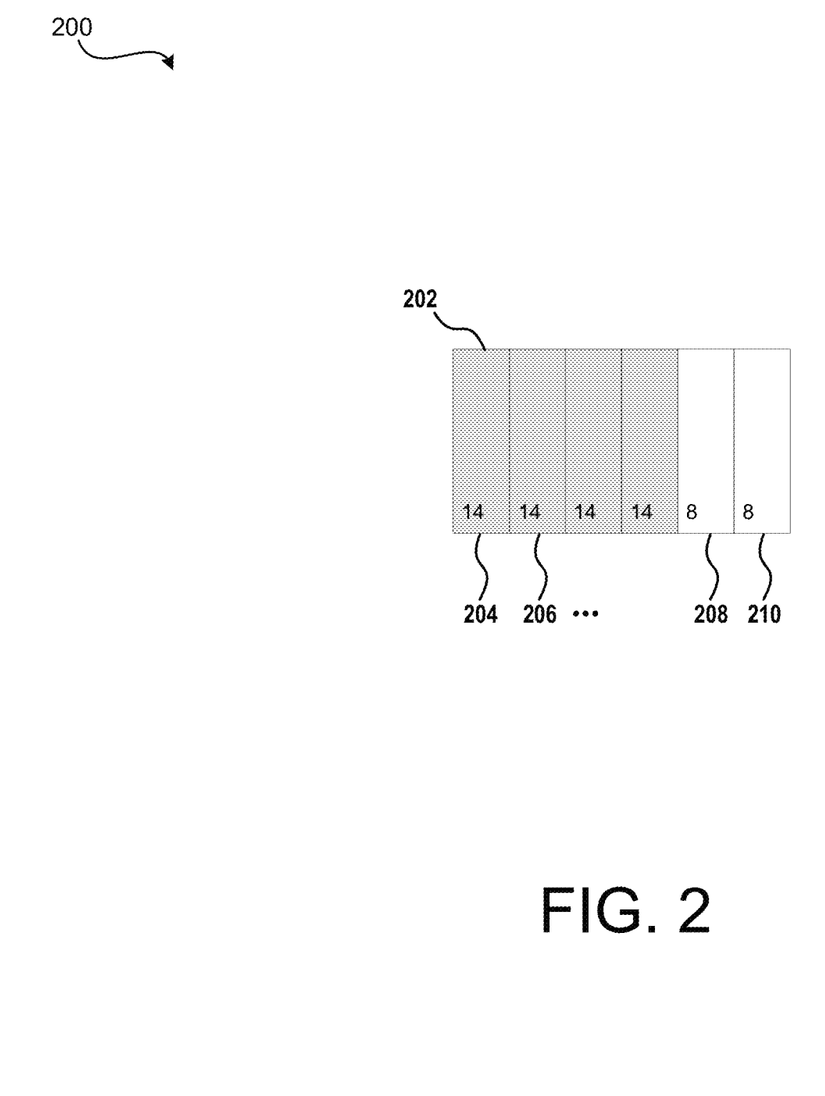
FIG. 2 shows a torn page.

Turning now to FIG. 2, illustrated is a torn page 200. While log records can vary in size, log 102 is managed in fixed page sizes, such as 4 kilobyte page 202 (although 3 kb, 8 kb, 16 kb, and other page sizes are similarly contemplated). However, this page size is often different from a sector size provided by a disk drive, which may be, for example 512 bytes, as illustrated by blocks 204 . . . 210. This can be a problem when power is lost in the middle of writing a 4 k log page across a number of 512 byte sectors, because while sector writes are atomic, it is possible that some of a 4 k page has been hardened while another portion has not, a condition known as a torn write. A torn write is an indication of corruption, a situation that does not often allow a recovery.

In one embodiment, torn writes are identified using an update array. Each 4 k page is associated with a sequence number, e.g. "14" or "8", and each 512 byte sector used to write that 4 k page has a portion reserved to store the sequence number. For example, a given 4 k page may be assigned sequence number 14, and so when reading the page, if any of the sectors are associated with a different sequence number, such as sequence number 8, a torn write is identified.

Figure 3:
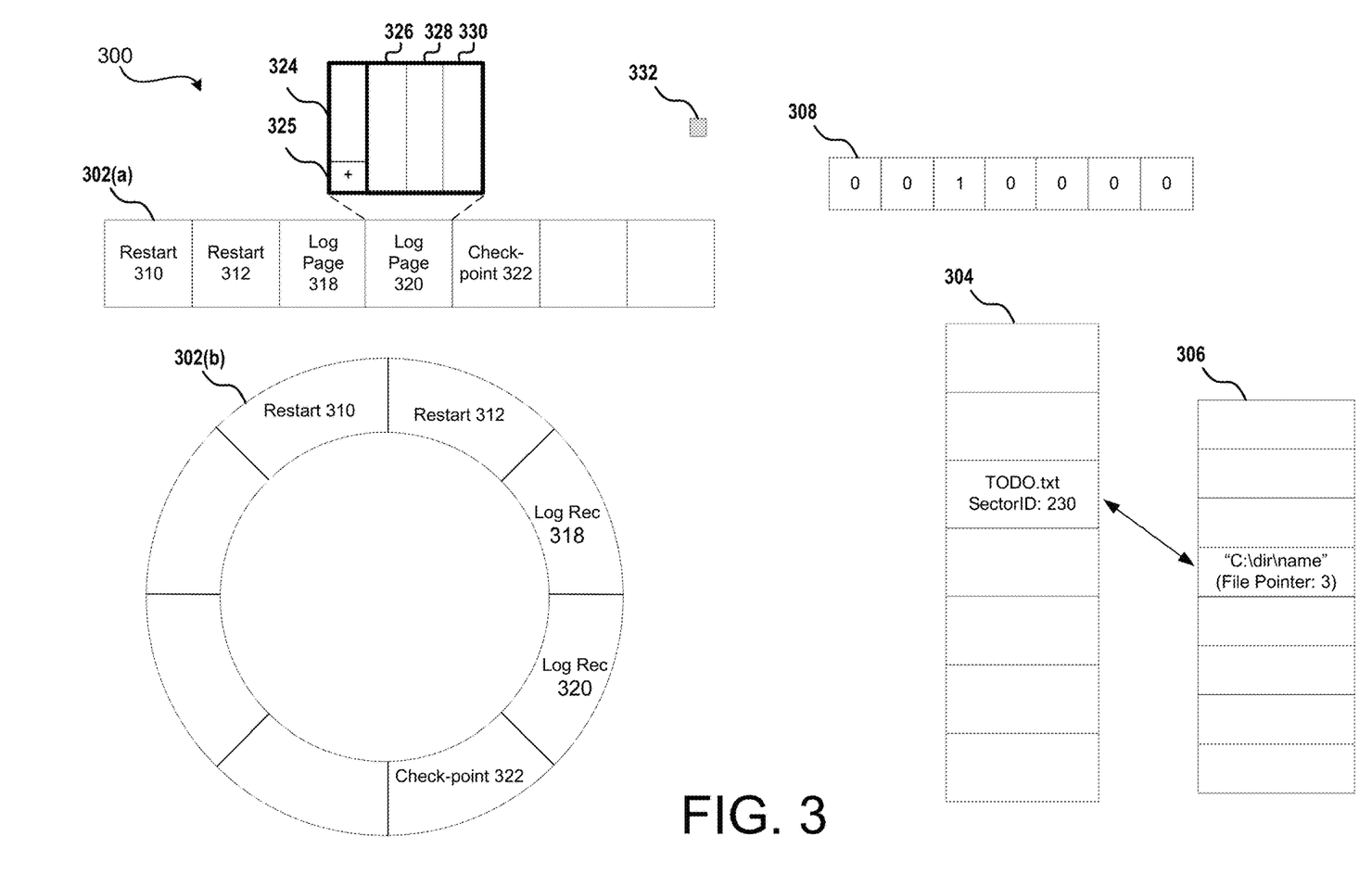
FIG. 3 shows portions of a file system used to commit, roll forward, and roll backward file operation metadata using persistent memory.

Turning now to FIG. 3, illustrated are portions of a file system 300 used to commit, roll forward, and roll backward file operation metadata using persistent memory.

As discussed above, persistent memory is a byte-addressable memory device that retains information when power is lost, and which is addressable over a memory bus. Persistent memory can be very fast when directly addressed over the memory bus (e.g. via a memory mapped file)—on the order of 10× faster than the fastest disk drives or SSDs. However, when a persistent memory is used as a storage device for the file system techniques described above, performance can suffer, particularly when file system operations require a high percentage of metadata operations (as opposed to content transfer operations), such as the creation of empty files or renaming of files. Other scenarios such as "write-through" operations, which require that all metadata be hardened to disk before the operation returns to a calling resource, are also much slower than comparable operations performed directly over the memory bus. However, applications will continue to utilize existing techniques for manipulating files, and so it is of great advantage to improve the performance of metadata intense file operations.

As shown in FIG. 3, one embodiment replaces volatile RAM with persistent memory as a medium for log 302, as depicted by persistent memory log 302(a) and log 302(b), representing in-memory and logical representations, respectively. Other embodiments may also store metadata tables 304-308 in persistent memory, and apply similar techniques as described below to identify torn writes. Because the persistent memory is non-volatile, file system 300 does not utilize ping-pong pages 114-116.

In one embodiment, file system 300 utilizes non-temporal copies when writing to file system log 302. Non-temporal copies are instructions that bypass the central processing unit's (CPU's) cache hierarchy causing write operations to be made directly to RAM, which in a memory mapped scenario, causes the write operation to be made directly to persistent memory. Additionally or alternatively, non-temporal copies may be approximated by immediately flushing a CPU's cache after a copy has been made. A CPU may have multiple layers of cache—e.g. level 1 (L1) cache, as well as a level 2 cache, a level 3 cache, etc., all of which are ideally bypassed. However, bypassing some cache levels is preferred to bypassing none, as any reduction in exposure to a crash before hardening the log will improve reliability. By utilizing non-temporal copies, log records are "hardened" as soon as the copy is performed.

In one embodiment, restart pages 310 and 312, as well as checkpoint record 322, are used to avoid scanning and processing the entire log 302 upon recovery, as discussed above with regard to FIG. 1.

Log 302 may include memory pages of a constant size. For example, memory pages of 4 k may be used to store one or more log records, or a larger log record may be stored across multiple 4 k memory pages. However, unlike log 102, which is periodically copied to disk across 512 byte sectors, log 302 is hardened as soon as log entries are copied to the persistent memory, obviating the issue of torn writes across 512 byte sectors.

Nevertheless, there is still a potential for torn writes, because data is copied to log 302 as a byte stream (e.g. one byte at a time, or, depending on the computing architecture, 32 or 64 bits at a time). Power can be lost at any point during the transfer, causing the transfer to halt mid-stream. This may interrupt a hardening procedure before it is complete, leaving a torn write, and jeopardizing the consistency of and/or the ability to restore the file system.

In one embodiment, log pages are validated using checksums. For example, log page 320 includes a header 324 and one or more log records, e.g. 326, 328, 330, etc. In one embodiment, a checksum is stored in a checksum field 325 of header 324. However, other locations for storing the checksum are similarly contemplated, including a body of the log page, adjacent to the log page, or in another table or other data structure at an index that corresponds to the index of the corresponding log page. Log records 326 and 328 store undo/redo information relating to a metadata table entry. Log record 330 is a transaction commit log record, the presence of which indicates that all log records related to that transaction have been written to the file system log.

In one embodiment, the checksum is generated for each page in the log, including when a log record spans multiple log pages. In one embodiment, a cyclical redundancy check algorithm, e.g. CRC32, is used to generate the checksum. In one embodiment, the checksum is based on an entire log page—i.e. the input to the checksum algorithm is the log page. Additionally or alternatively, the checksum may be based on a portion of a log page, such as a portion of the page that is in use, or a body portion of the page, or a portion of the page excluding checksum field 325.

In one embodiment, when a log record is to be added to a log page, the log record is written to log page 320 before the checksum is calculated. In this way, any existing log records are also included in the calculation of the checksum. For example, log page 320 may already have stored log record 326 when a request to store log record 328 is received. In this case, log record 328 is written to log page 320 before a checksum is calculated. In this way, the checksum is calculated based on the entire log page 320, including log records 326 and 328, and stored in checksum field 325 of header 324.

In one embodiment, before the checksum is calculated, a predefined value is written to checksum field 325. For example, a value of "0" or "0xcccccccc" may be written to checksum field 325, potentially overwriting an existing checksum value. In this way, a checksum of the entire log page can be calculated with a known value in the checksum field. This avoids generating a checksum over the log page, at which point storing the checksum in the log page would invalidate the checksum. In another embodiment, the checksum is generated based on the body of the log page, or every portion of the log page except checksum field 325.

During a recovery operation, in one embodiment, log page 320 is read, and the checksum is extracted and copied into a temporary variable. Then, the predefined value (e.g. "0" or "0xcccccccc") is copied into the checksum field 325, and a second checksum 332 is generated based on the extracted log page as modified. In one embodiment, the second checksum 332 is compared with the checksum field 325, and when the checksums match, recovery can take place as described above with regard to FIG. 1.

However, when the checksum field 325 and the second checksum 332 don't match, a torn write is detected. Once a torn write is detected, the given log page is deemed invalid and any log records on the page are ignored (as the data is suspect). The file system will recover using log records in entries prior to this log page.

Figure 4:
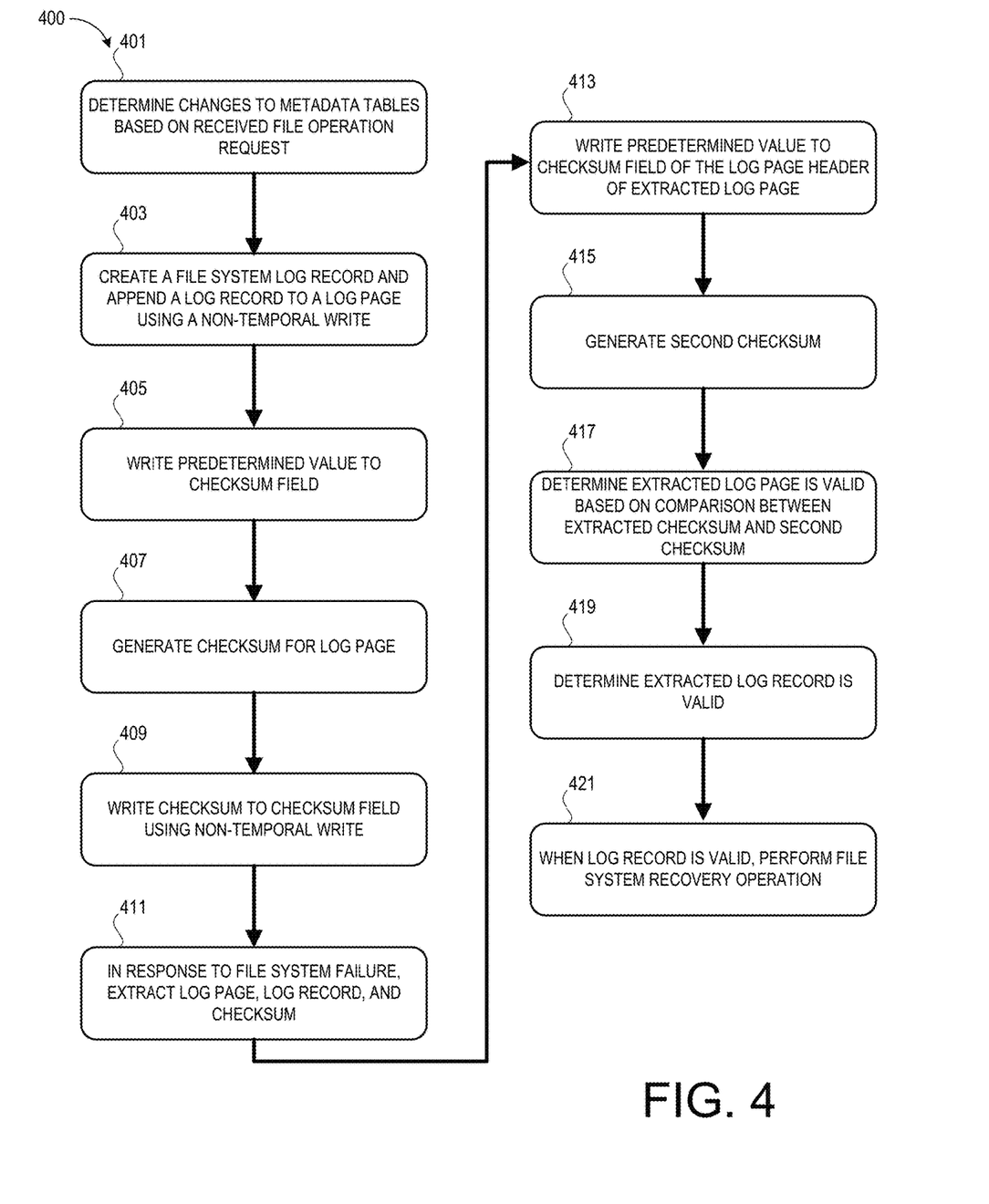
FIG. 4 is a flow diagram of an example method for write-ahead style logging in a persistent memory device.

FIG. 4 is a flow diagram of an example method 400 for improving file system performance on a computing device by generating a file system log in a non-volatile persistent memory. It should be understood by those of ordinary skill in the art that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, performed together, and/or performed simultaneously, without departing from the scope of the appended claims.

At block 401, a system (e.g., the file system 100) receives a file operation request. The file operation request may include, for example, a create, a read, a write, an append, a copy, a move, or a delete operation, or the like. The file operation request may be received from a user, or be part of an automated process.

In one embodiment, the content of the file associated with the file system operation is stored in persistent memory. In another embodiment, the content of the file associated with the file system operation is stored in sector-based storage, such as a disk driver or NAND based SSD. In one embodiment the non-volatile persistent memory is one component of a heterogeneous memory storage solution that includes a sector-addressable non-volatile storage, and wherein a content of a file associated with the file system operation is stored in the sector-addressable non-volatile storage. In one embodiment, metadata tables such as master file table 104, directory table 106, master file table bitmap 108, and the like, are also stored in a sector-addressable non-volatile storage.

In one embodiment, in order to process the file operation request, the file system determines one or more changes to be made to metadata tables, such as master file table 104, directory table 106, master file table bitmap 108, or the like. For example, in response to a create file operation, the file system may determine to create a new entry in master file table 104 and a new entry in directory table 106. However, if the directory already exists on the storage device, the file system may determine to update the existing entry. In another example, in response to a delete file request, the file system may determine to remove corresponding entries from master file table 104 and directory table 106.

At block 403, the file system creates a file system log record ("log record") for each change to a metadata table, and appends it to a log page using a non-temporal write. The file system also appends a log record representing a "transaction commit" to the log page, which indicates that all log records associated with a particular file operation request have been recorded. In this way, log records can be processed transactionally—i.e. either all of the metadata table changes associated with the transaction are applied, or all of the metadata table changes associated with the transaction are undone (as if they were not performed in the first place). These changes are enabled by "redo" and "undo" records included in each log record.

For example, log record 326, log record 328, and transaction commit record 330 may be appended to log page 320 of the file system log. In one embodiment the appending is performed using a non-temporal write, wherein the non-temporal write includes writing to byte-addressable persistent memory without caching in a memory hierarchy. The non-temporal write may be performed by using a memory copy operation to a memory mapping that is backed by the persistent memory, but any other form of copying to persistent memory is similarly contemplated.

In one embodiment, the log records 326 and 328 are appended to an empty log page 320. However, in other embodiments, a log record may be added to a log page that already contains another log record. For example, if log record 326 was already written to log page 320, and as part of a separate transaction log record 328 was generated, log record 328 could be copied into (e.g. appended) to log page 320. Additional log records may continue to be added to the log page, limited only by the capacity of the log page.

In one embodiment, the log record to be appended to the log page is larger than the log page (or larger than an amount of free space remaining in a log page). In these embodiments, the log record may be written across two or more log pages.

In one embodiment, the log record is written to the log page using a memory copy operation. In one embodiment a byte by byte transfer, such as a stream copy, is used, although copying chunks of data of varying sizes is similarly contemplated, such as 32 bits at a time, 64 bits at a time, and the like.

At block 405, a predetermined value is written to a checksum field 325 of a header 324 of the log page 320. The predetermined value is arbitrary, as long as the same value is used consistently throughout the process. For example, the predetermined value may be "0" or "0xdeadbeef" or any other constant value. The predetermined value is only limited by the size of the checksum field 325. For example, if checksum field 325 is 32 bits, because the checksum algorithm is CRC32, then the predetermined value is limited to a 32 bit value.

At block 407, the file system generates a checksum of the log page 320 for the purpose of verifying the log record 326 in the non-volatile persistent memory. In one embodiment a CRC32 algorithm is used, but any other checksum algorithm or hashing algorithm is similarly contemplated.

At block 409, the checksum is written to the checksum field 325 using a non-temporal write. In one embodiment, writing the checksum includes overwriting the predetermined value.

At block 411, the log page 320 is extracted from the file system log. In one embodiment this is performed as part of a recovery process triggered by a file system failure. The file system failure may be caused by a power outage, system crash, CPU halt, hardware error, dead battery, or any other reason that program execution may be halted and/or power is lost. In one embodiment, the checksum is copied into a temporary variable for use in block 417.

At block 413, the predetermined value is written to the checksum field 325 of the header 324 of the extracted log page 320. This sets the extracted log page into the same state as when the checksum was generated.

At block 415, a second checksum is generated from the extracted log page. The checksum algorithm used is the same as the algorithm used in block 409.

At block 417, a determination is made whether or not the extracted log page is valid based on a comparison between the extracted checksum and the second checksum. In one embodiment the page is determined to be valid if the checksum and the second checksum match (e.g. are "equal"). If the checksums are not equal, then a torn write, or some other form or corruption has occurred.

At block 419, a determination is made whether or not the extracted log record is valid based on the validity of the extracted log page. In one embodiment the extracted log record is determined to be valid if the log page it was extracted from was determined to be valid.

At block 421, when the extracted log record is determined to be valid, a file system recovery operation is performed, as described above with regard to FIG. 1. In one embodiment the file system recovery operation updates the metadata table to ensure consistency between the extracted log record and the metadata table, wherein consistency enables continued operation of the computing device after the file system failure. When the extracted log record is valid and is determined to be part of a committed transaction (i.e. the corresponding commit record is identified), then any changes included in the extracted log record which were not applied to the specified metadata table are applied, using the "redo" information included in the log record.

However, if the extracted log record is determined to be valid but not part of a complete transaction (i.e. the corresponding commit record has not been found), then any changes applied to the metadata table will be undone, using the "undo" information included in the log record.

Figure 5:
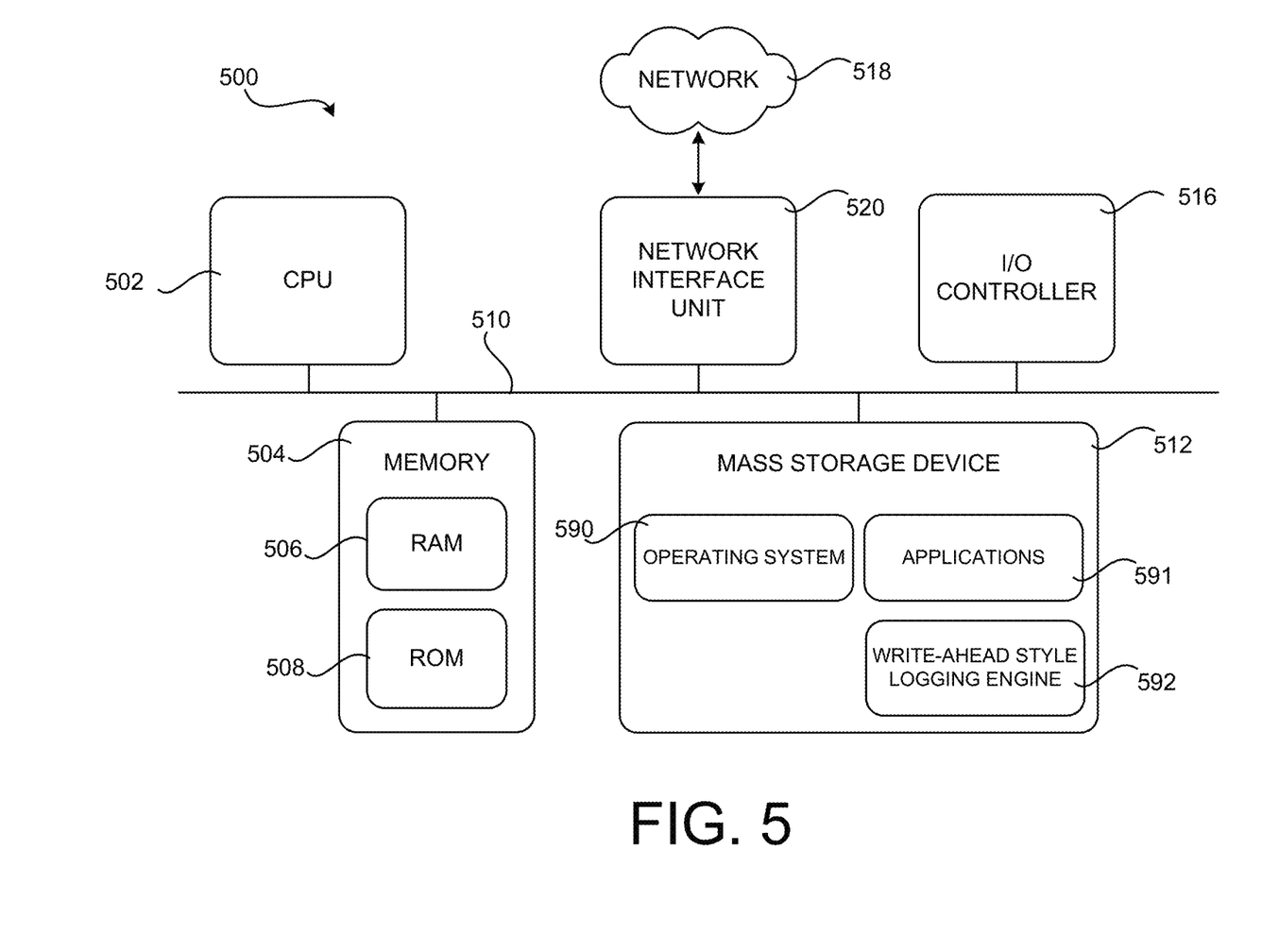
FIG. 5 is a computer architecture diagram illustrating an illustrative hardware and software architecture for a computing system capable of implementing aspects of the techniques and technologies presented herein.

FIG. 5 is a computer architecture diagram that shows an architecture for a computer 500, e.g., the computer 101, capable of executing the software components described herein. The architecture illustrated in FIG. 5 is an architecture for a server computer, mobile phone, an e-reader, a smart phone, a desktop computer, a netbook computer, a tablet computer, a wearable device, a laptop computer, or another type of computing device suitable for executing the software components presented herein.

In this regard, it should be appreciated that the computer 500 shown in FIG. 5 can be utilized to implement a computing device capable of executing any of the software components presented herein. For example, and without limitation, the computing architecture described with reference to FIG. 5 can be utilized to implement the computing device 101 illustrated in FIG. 1 and described above, which is capable of executing an operating system 590, applications 591, and the file system (write-ahead style logging engine) 592 and/or any of the other software components described above.

The computer 500 illustrated in FIG. 5 includes a central processing unit 502 ("CPU"), a system memory 504, including a random-access memory 506 ("RAM") and a read-only memory ("ROM") 508, and a system bus 510 that couples the memory 504 to the CPU 502. A basic input/output system ("BIOS" or "firmware") containing the basic routines that help to transfer information between elements within the computer 500, such as during startup, is stored in the ROM 508. The computer 500 further includes a mass storage device 512 for storing the operating system 590, the applications 591, and the file system 592 and other components for implementing the techniques disclosed herein. The mass storage device 512 can also be configured to store other types of programs and data.

The mass storage device 512 is connected to the CPU 502 through a mass storage controller (not shown) connected to the bus 510. The mass storage device 512 and its associated computer readable media provide non-volatile storage for the computer 500. Although the description of computer readable media contained herein refers to a mass storage device, such as a hard disk, CD-ROM drive, DVD-ROM drive, or USB storage key, it should be appreciated by those skilled in the art that computer readable media can be any available computer storage media or communication media that can be accessed by the computer 500.

Communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner so as to encode information in the signal. By way of example, and not limitation, communication media includes wired media such as a wired network or direct-wired connection, and wireless media such as acoustic, radio frequency, infrared and other wireless media. Combinations of [the] any of the above should also be included within the scope of computer readable media.

By way of example, and not limitation, computer storage media can include volatile and non-volatile, removable and non-removable media implemented in any method or technology for storage of information such as computer readable instructions, data structures, program modules or other data. For example, computer storage media includes, but is not limited to, RAM, ROM, EPROM, EEPROM, flash memory or other solid-state memory technology, CD-ROM, digital versatile disks ("DVD"), HD-DVD, BLU-RAY, or other optical storage, magnetic cassettes, magnetic tape, magnetic disk storage or other magnetic storage devices, or any other medium that can be used to store the desired information and which can be accessed by the computer 500. For purposes of the claims, the phrase "computer storage medium," and variations thereof, does not include waves or signals per se or communication media.

According to various configurations, the computer 500 can operate in a networked environment using logical connections to remote computers through a network such as the network 518. The computer 500 can connect to the network 518 through a network interface unit 520 connected to the bus 510. It should be appreciated that the network interface unit 520 can also be utilized to connect to other types of networks and remote computer systems. The computer 500 can also include an input/output controller 516 for receiving and processing input from a number of other devices, including a keyboard, mouse, touch input, or electronic stylus (not shown in FIG. 5). Similarly, the input/output controller 516 can provide output to a display screen, a printer, or other type of output device (also not shown in FIG. 5).

It should be appreciated that the software components described herein, such as the operating system 590, the applications 591, and file system 592, when loaded into the CPU 502 and executed, can transform the CPU 502 and the overall computer 500 from a general-purpose computing system into a special-purpose computing system customized to facilitate the functionality presented herein. The CPU 502 can be constructed from any number of transistors or other discrete circuit elements, which can individually or collectively assume any number of states. More specifically, the CPU 502 can operate as a finite-state machine, in response to executable instructions contained within the software modules disclosed herein. These computer-executable instructions can transform the CPU 502 by specifying how the CPU 502 transitions between states, thereby transforming the transistors or other discrete hardware elements constituting the CPU 502.

Encoding the software modules presented herein can also transform the physical structure of the computer readable media presented herein. The specific transformation of physical structure depends on various factors, in different implementations of this description. Examples of such factors include, but are not limited to, the technology used to implement the computer readable media, whether the computer readable media is characterized as primary or secondary storage, and the like. For example, if the computer readable media is implemented as semiconductor-based memory, the software disclosed herein can be encoded on the computer readable media by transforming the physical state of the semiconductor memory. For instance, the software can transform the state of transistors, capacitors, or other discrete circuit elements constituting the semiconductor memory. The software can also transform the physical state of such components in order to store data thereupon.

As another example, the computer readable media disclosed herein can be implemented using magnetic or optical technology. In such implementations, the software presented herein can transform the physical state of magnetic or optical media, when the software is encoded therein. These transformations can include altering the magnetic characteristics of particular locations within given magnetic media. These transformations can also include altering the physical features or characteristics of particular locations within given optical media, or to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the computer 500 in order to store and execute the software components presented herein. It also should be appreciated that the architecture shown in FIG. 5 for the computer 500, or a similar architecture, can be utilized to implement other types of computing devices, including hand-held computers, embedded computer systems, mobile devices such as smartphones and tablets, and other types of computing devices known to those skilled in the art. It is also contemplated that the computer 500 might not include all of the components shown in FIG. 5, can include other components that are not explicitly shown in FIG. 5, or can utilize an architecture completely different than that shown in FIG. 5.

In closing, although the various configurations have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

The invention claimed is:

1. A method for improving file system performance on a computing device by generating a file system log in a non-volatile persistent memory, wherein the non-volatile persistent memory is byte-addressable from a memory bus, wherein the file system log includes one or more log pages, wherein each of the one or more log pages includes one or more log records, and wherein each log record describes a change to a metadata table that defines, in part, a file system operation, the method comprising:
   appending a log record to a log page using a non-temporal write, wherein the non-temporal write includes writing to the persistent memory without caching in a memory hierarchy;
   writing a predetermined value to a checksum field of a header of the log page;
   generating a checksum of the log page for the purpose of verifying a validity of the log page in the non-volatile persistent memory;
   writing the checksum to the checksum field using a non-temporal write, wherein writing the checksum includes overwriting the predetermined value;
   after writing the checksum to the checksum field, extracting the log page, the log record, and the checksum from the file system log;
   generating a second checksum of the extracted log page;
   determining when the extracted log page is valid based on a comparison between the extracted checksum and the second checksum;
   determining when the extracted log record is valid based on the validity of the extracted log page; and
   when the extracted log record is determined to be valid, performing a file system recovery operation.

2. The method of claim 1, wherein a different log record is stored in the log page before the log record is appended.

3. The method of claim 1, further comprising:
   appending a second log record to the log page using a non-temporal write, wherein the second log record describes a change to a second metadata table, and wherein the log page continues to store the log record;
   writing the predetermined value to the checksum field of the header of the log page;
   generating a third checksum of the log page based on the log record, the second log record, and the predetermined value of the checksum field;
   writing the third checksum to the checksum field using a non-temporal write, wherein writing the third checksum includes overwriting the predetermined value;
   after writing the third checksum to the checksum field, in response to a file system failure, and upon restarting the file system, extracting the log page, the log record, the second log record, and the third checksum from the file system log;
   writing the predetermined value to the checksum field of the header of the extracted log page;
   generating a fourth checksum based on the extracted log page;
   determining when the extracted log page is valid based on a comparison between the extracted third checksum and the fourth checksum;
   determining when the extracted log record and the extracted second log record are valid based on the validity of the extracted log page; and
   when the extracted log record and the extracted second log record are determined to be valid, performing a file system recovery operation, wherein the file system recovery operation updates the metadata table and the second metadata table to ensure consistency with the extracted log record and the extracted second log record, wherein consistency enables continued operation of the computing device after the failure.

4. The method of claim 1, wherein performing the file system recovery operation includes:
   determining whether the log record is part of a committed transaction;
   determining whether a change defined in the log record has not been applied to the metadata table; and
   when the log record is part of a committed transaction and when the change has not been applied to the metadata table, rolling forward the change to the metadata table.

5. The method of claim 1, wherein performing the file system recovery operation includes:
   determining whether the log record is not part of a committed transaction;
   determining whether a change defined in the log record has been applied to the metadata table; and
   when the log record is not part of a committed transaction and when the change has been applied to the metadata table, rolling back the change to the metadata table.

6. The method of claim 1, wherein the metadata table includes one or more of a master file table and a directory table.

7. The method of claim 1, wherein the log record spans a plurality of log pages, wherein each of the plurality of log pages is associated with a checksum.

8. The method of claim 1, further comprising:
   writing the predetermined value to the checksum field of the header of the extracted log page.

9. The method of claim 1, wherein the log page contains a previously written log record and a previously written checksum, wherein writing the predetermined value to the checksum field of the header of the log page overwrites the previously written checksum, and wherein generating the checksum of the log page comprises computing a checksum of at least the previously written log record, the appended log record, and the predetermined value.

10. A computing device for improving file system performance by generating a file system log in a non-volatile persistent memory, wherein the non-volatile persistent memory is byte-addressable from a memory bus, wherein the file system log includes one or more log pages, wherein each of the one or more log pages includes one or more log records, and wherein each log record describes a change to a metadata table that defines, in part, a file system operation, the computing device comprising:
   one or more processors;
   a memory in communication with the one or more processors, the memory having computer-readable instructions stored thereupon which, when executed by the one or more processors, cause the computing device to:
   append a log record to a log page;
   write a predetermined value to a checksum field of a header of the log page;
   generate a checksum of the log page;
   write the checksum to the checksum field of the header of the log page, overwriting the predetermined value without overwriting other portions of the log page;
   extract the log page, the log record, and the checksum from the file system log;
   generate a second checksum of the extracted log page in part by substituting the predetermined value for the checksum when computing the second checksum;

determine when the extracted log page is valid based on a comparison between the extracted checksum and the second checksum;

determine when the extracted log record is valid based on the validity of the extracted log page; and when the extracted log record is determined to be valid, perform a file system recovery operation.

11. The computing device of claim 10, wherein the log page and the checksum are written to the file system log using a memory copy operation.

12. The computing device of claim 10, wherein the file system failure includes a system crash, a system hang, a power outage, or a hardware error.

13. The computing device of claim 10, wherein a content of a file associated with the file system operation is stored in the persistent memory.

14. The computing device of claim 10, wherein determining that the checksum differs from the second checksum identifies a torn write condition in the extracted log record.

15. The computing device of claim 10, wherein the file system operation includes a create, a read, a write, an append, a copy, a move, or a delete operation.

16. The computing device of claim 10, wherein the instructions further cause the computing device to:

write the predetermined value to the checksum field of the header of the extracted log page.

17. A method for improving file system performance on a computing device by generating a file system log in a non-volatile persistent memory, wherein the non-volatile persistent memory is byte-addressable from a memory bus, wherein the file system log includes one or more log pages, wherein each of the one or more log pages includes one or more log records, and wherein each log record describes a change to a metadata table that defines, in part, a file system operation, the method comprising:

writing a log record to a log page in the non-volatile persistent memory;

writing a predetermined value to a checksum field of a header of the log page;

generating a checksum of the log page; and performing a non-temporal write of the checksum to a checksum field of the log page in the non-volatile persistent memory, overwriting the predetermined value without overwriting other portions of the log page.

18. The method of claim 17, wherein the non-volatile persistent memory is one component of a heterogeneous memory storage solution that also includes a sector-addressable non-volatile storage, and wherein a content of a file associated with the file system operation is stored in the sector-addressable non-volatile storage.

19. The method of claim 18, wherein the sector-addressable non-volatile storage includes a disk drive or a NAND based solid state drive.

20. The method of claim 17, wherein the metadata table is stored in a sector-addressable non-volatile storage, wherein a file associated with the file system operation includes a data portion, and wherein the data portion is stored in the sector-addressable non-volatile storage.

* * * * *